United States Patent Office 3,545,861
Patented Dec. 8, 1970

3,545,861
SELECTIVE TARGET RANGING SYSTEM
Robert P. Farnsworth, Los Angeles, and Edward J. Kapp, San Pedro, Calif., assignors to Hughes Aircraft Company, Culver City, Calif., a corporation of Delaware
Filed Apr. 8, 1966, Ser. No. 541,218
Int. Cl. G01c 3/08
U.S. Cl. 356—5          10 Claims

ABSTRACT OF THE DISCLOSURE

A selective ranging system where, in one embodiment, an electric pulse circuit means causes a control and a range counter to start counting at the time a transmitter is fired. The control counter determines the minimum and maximum range limits that a target range circuit means may process target return signals from remote targets. A logic circuit means selects either the first or the last target return signal within the predetermined minimum and maximum range limits as the last target that the target range circuit means may process for range determination by the range counter. The output of the range counter is applied to a range display circuit for a visual indication of the range of the selected target.

---

This invention relates generally to digital ranging systems and more particularly to digital ranging systems capable of accurately determining the range of a selective target.

A digital ranging system may be incorporated with a radar system or a laser ranging system to provide a digital readout of the range of particular targets. Prior digital ranging systems have usually utilized either multiple storage registers, multiple counters, or count backward schemes to determine the range of particular targets. However, each of the aforementioned schemes generally involves considerable complex arrangements, and in most cases cannot be utilized at very high clock rates. Thus, the prior art has not provided a digital ranging system capable of providing accurate digital range measurement of a particular target, such as a vehicle, when the vehicle may be located relatively close to power lines, trees, or other adjacent targets.

Accordingly, it is an object of the present invention to provide an improved digital ranging system capable of accurately measuring the range of a selected target.

It is a further object of the present invention to provide an improved digital ranging system capable of accurately measuring the range of either the first or the last of several targets within the intended range limits of the system.

It is a still further object of the present invention to provide an improved digital ranging system capable of operating at a relatively high clock rate, thus providing greater discrimination between closely spaced targets.

It is another object of the present invention to provide an improved digital ranging system that is relatively simple in construction, reliable and accurately in determining the range of a selected target.

Briefly, in accordance with the objects set forth above, one of the embodiments of the present invention provides a selective target ranging system capable of processing target return signals within predetermined range limits comprising a control counter, a range counter, an electric pulse circuit means coupled to both counters for causing both counters to count, target range circuit means for receiving signals indicative of the range of remote targets and having an output coupled to the range counter for controlling the range counter, and logic circuit means coupling outputs of the control counter to the target range circuit means for controlling the target range circuit means.

Figure 1:
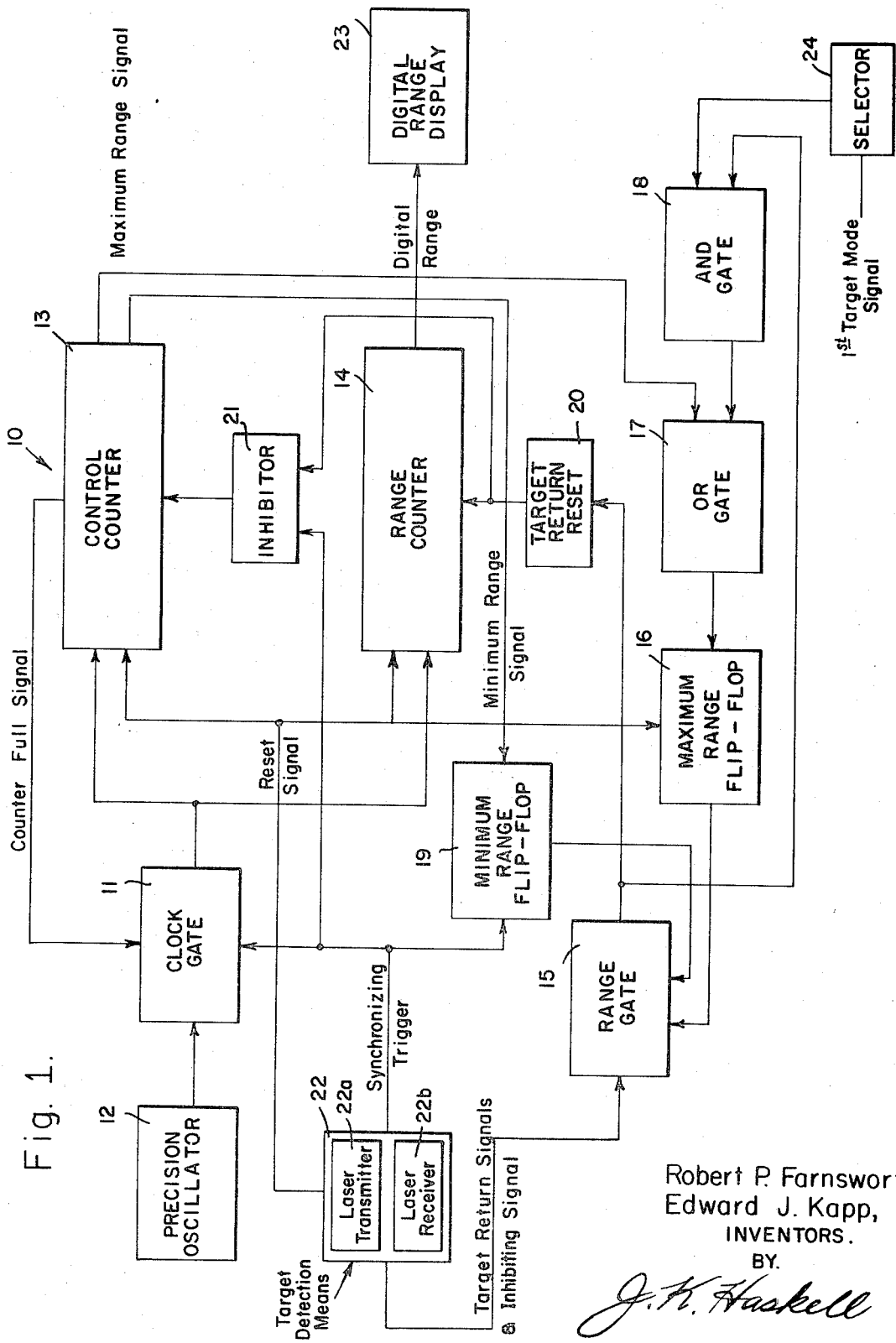
Figure 2:
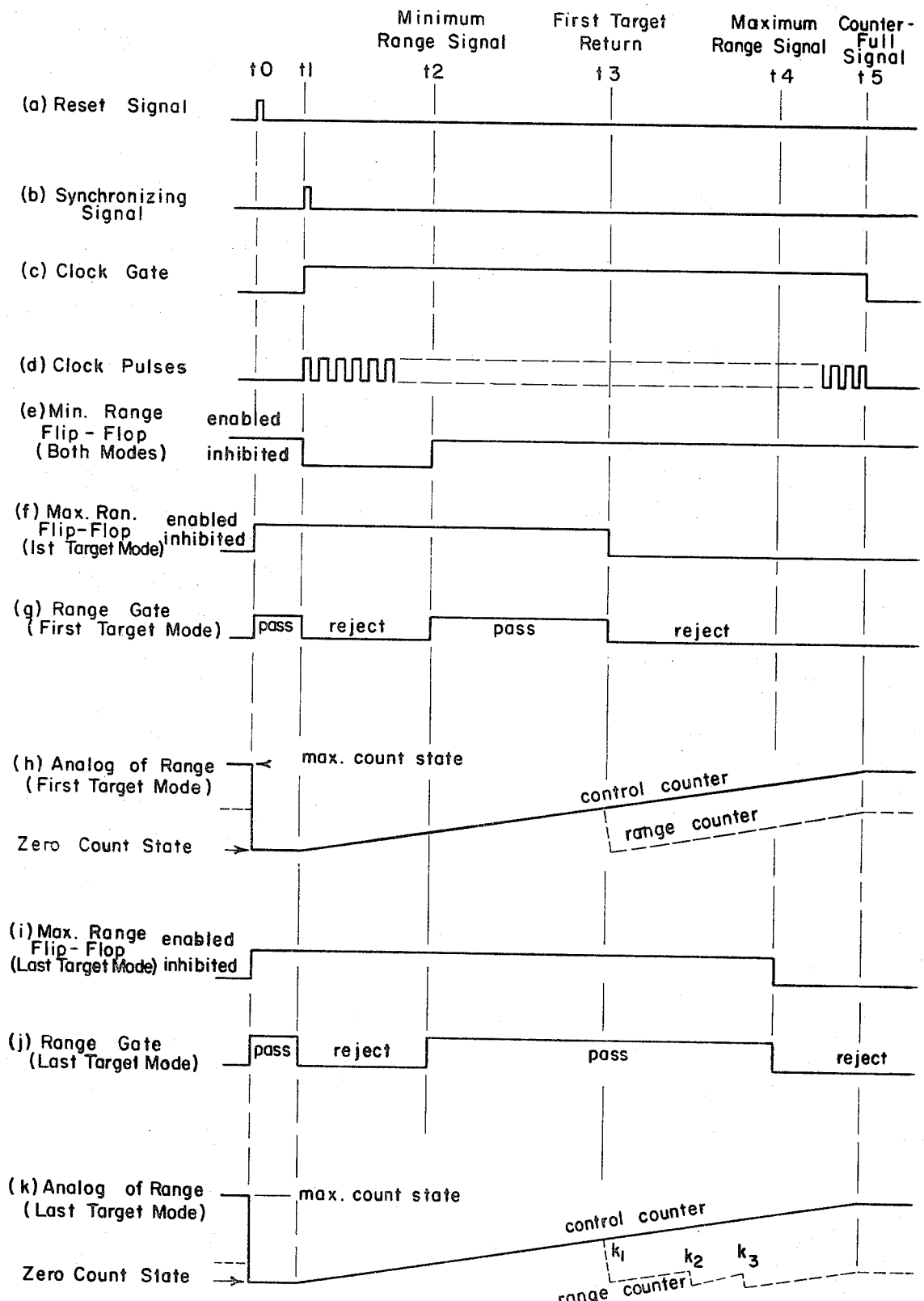

Additional objects, advantages, and characteristic features of the present invention will become readily apparent from the following detailed description of preferred embodiments of the invention when taken in conjunction with the accompanying drawings in which:

FIG. 1 is a schematic diagram illustrating a selective target ranging system embodying the principles of this invention; and FIG. 2 illustrates the operation of a selective target ranging system of the type of FIG. 1 as a function of time.

Referring now to FIG. 1, a selective target ranging system 10, or range indicating circuit, which has the capabilities of two modes of operation is shown. The choice of modes of operation allows the operator to determine the range of either a first target beyond a minimum range or the last of several targets within the intended minimum to maximum range limits of the system.

A control counter 13 and a range counter 14, which may be conventional binary counters, such as a ripple type, are utilized to register the counting sequence in order to determine the range of a selected target. The control counter 13 is primarily utilized to control the period of time that both counters register their respective counts and to initiate signals that are applied to the associated circuitry that controls which target return signals will be processed by the selective target ranging system 10. The aforementioned target return signals are supplied to the system 10 by a target detection means 22, which may be a conventional radar or laser ranging system. The laser ranging system would include a laser transmitter 22A and a laser receiver 22B. It is to be understood, however, that in a conventional radar system the units 22A and 22B would respectively represent a radar transmitter and a radar receiver. The range counter 14 is reset to its zero count state by a target return reset 20, which may be a monostable or single-shot mutlivibrator, every time a target return signal is processed by the selective target ranging system 10. Additionally, the digital range of the selected target is available by taking the digital output from the complement side of each binary counter element (not shown) in the range counter 14. The aforementioned digital output may be displayed on a digital range display 23, which may be a conventional digital display. Appropriate timing (not shown) for sampling the digital output from the complement side of each binary counter element in the range counter 14 is provided to the digital range display 23. The digital display 23 may be similar to the digital read out described on pages 28, 86, and 188–190 in the book Digital Voltmeters published by Non-Linear Systems, Inc., Del Mar, Calif. (1962). In order that the count register in the counters 13 and 14 may be synchronized to provide accurate range measurement of targets, an inhibitor 21, which may be a conventional AND gate is utilized to inhibit the control counter 13 at the commencement of the counting sequence for a period of time equal to the normal reset pulse time of the target return reset 20.

A clock gate 11, which may include a conventional flip-flop and a conventional AND gate, is utilized to control the flow of clock pulses that initiate the counting sequence. The clock pulses are supplied by a precision oscillator 12, which may be a crystal oscillator. The range gate 15, which may be a conventional AND gate, is utilized to inhibit the processing of targe return signals by the target ranging system 10 within a minimum range and beyond the intended range of the system. The respective outputs from a maximum range flip-flop 16 and a minimum range flip-flop 19, which are conventional flip-flops, control the operation of the range gate 15. The OR gate 17 and the AND gate 18, which are conventional logic networks and a target mode selector 24, are utilized to process the signals that control the modes of operation of the selective target ranging system 10. It is noted that the principles of this invention are not limited to any particular type of logical design, but any appropriate type, such as, AND logic, OR logic, NAND logic, or NOR logic, may be utilized in accordance with the principles of this invention.

In the operation of the selective target ranging system 10, the clock gate 11 is utilized to control the initiation of a counting sequence to determine the range of a selected target. A sychronizing trigger from the target detection means 22 is applied to the clock gate 11 at the time that the energy pulse of a conventional ranging, transmitter, which may be part of either a radar or laser ranging system, is transmitted. The synchronizing trigger sets the flip-flop circuit of the clock gate 11 to the "on" condition and allows the clock pulses from the precision oscillator 12 to pass through the AND gate portion of the clock gate 11 to the control counter 13 and the range counter 14, to allow the commencement of the counting sequence.

The counters 13 and 14 have been previously reset to their zero count state prior to the occurrence of the synchronizing trigger by a system reset signal from the target detection means 22. The only requirement on the system reset signal is that it resets both counters to their zero count state prior to the firing of the transmitter. The control counter 13 will count continuously upon the reception of the clock pulses from the precision oscillator 12, except for a period of time at the beginning of each counting sequence, until the counter is full, at which time a "counter full signal" from the control counter 13 is applied to the clock gate 11. This "counter full signal" will place the clock gate 11 in an "off" condition; thereafter, no additional clock pulses will be applied to the counters 13 and 14, thus, the counting sequence will cease.

The inhibiting of the control counter 13 for a period of time equal to the normal reset pulse time of the target return reset 20 is required in order to provide accurate range measurement of targets. The duration of the target return reset pulse generated by the target return reset 20 is required to be long enough to allow the range counter 14 to return to its zero count state regardless of the count registered in the counter. As will be more clearly shown in the later discussion of the timing sequence illustrated by FIG. 2, the reset periods of the range counter 14 do not have a cumulative effect on the digital range measurement of a selected target. Therefore, it is only necessary to inhibit the counting of the control counter 13 once during a particular counting cycle. The inhibiting period is accomplished by the simultaneous presence of the synchronizing trigger and an inhibiting signal at the inputs of the inhibitor 21 at the commencement of the counting sequence. The inhibiting signal occurs at the same time as that of the synchronizing trigger; however, it is routed through the range gate 15 and the target return reset 20. Since the inhibiting signal is routed through the target return reset 20, the control counter 13 will be inhibited for a period of time equal to the normal reset pulse time of the range counter 14.

On the other hand, the range counter 14 will continue to count until the "counter full signal" places the clock gate 11 in an "off" condition except for the period or periods of time that the counter 14 is reset to its zero count state by a target return reset signal that has been initiated by the inhibiting signal or a target return signal. The inhibiting signal and each target return signal that occurs during the time the range gate 15 is in the "on" condition will pass through the range gate 15 and will be applied to the target return reset 20 which will then initiate a target return reset signal that will be applied to the range counter 14. The target return reset signal will reset the range counter 14 to its zero count state for the duration of the target return reset pulse after which the counting of the range counter 14 commences again.

The selective target ranging system 10 may operate in two modes. In a first mode, hereinafter referred to as the first target mode, wherein the range of the first target return beyond a minimum range may be determined. In a second mode, hereinafter referred to as the last target mode, the range of the last target return within the intended range limits may be determined. To accomplish this two-mode operation between the minimum and maximum range limits, two flip-flops and associated circuitry are incorporated into the system. The minimum range flip-flop 19 is utilized to prevent any target return signals from passing through the range gate 15 within a predetermined minimum range. The maximum range flip-flop 16 is utilized to prevent any target return signals from passing through the range gate 15 either after the first target return signal has passed through the range gate 15 when the system is in the first target mode, or beyond a maximum range when the system is in the last target mode.

When the selective target ranging system 10 is in either of the aforementioned modes, the function of the range gate 15, as stated earlier, is to inhibit the processing of target return signals by the system within a minimum range and beyond the intended range of the system. The inhibiting of target return signals within a minimum range is of primary importance when the ranging transmitter device is of the laser type, so that any laser backscatter return is not processed. The range gate 15 operation is controlled by the outputs of the minimum range flip-flop 19 and the maximum range flip-flop 16. The range gate 15 will pass a signal only when both flip-flops are enabled and thus simultaneously apply their respective signals to the range gate 15.

The normally inhibited maximum range flip-flop 16 is enabled by the system reset signal which occurs prior to the initiation of the synchronizing trigger. Since the normally enabled minimum range flip-flop 19 is in an enabled condition at the time of the reset signal, the range gate 15 will pass the inhibiting signal at the time when the synchronizing trigger occurs. One way this could be accomplished is by delaying the response of the minimum range flip-flop 19 to the synchronizing trigger. The inhibiting signal, as stated earlier, is utilized in conjunction with the synchronizing trigger to inhibit the count of the control counter 13 for a period of time equal to the normal reset pulse time of the target return reset 20 in order that accurate measurement of the selected target may be accomplished.

When the selective target ranging system 10 is in the first target mode, the synchronizing trigger will be applied to the normally enabled minimum range flip-flop 19. This synchronizing trigger causes the minimum range flip-flop 19 to change to its inhibited state. Thus the proper signal from the minimum range flip-flop 19 that, in conjunction with the proper signal from the maximum range flip-flop 16, would be required to place the range gate 15 in the "on" condition will not be generated by the flip-flop 19. Therefore, no target return signals will be processed by the system. The minimum range flip-flop 19 will remain in its inhibited state until it is enabled by the "minimum range signal" from the control counter 13. At this time, since the maximum range flip-flop 16 is in its enabled state, the range gate 15 will be capable of passing target return signals. However, in the first target mode the maximum range flip-flop 16 is disabled when the first target return signal is processed by the system, thus only one target return signal will pass through the range gate 15. The placing of the maximum range flip-flop 16 in its inhibited state is accomplished by applying the first target return signal to a first input of the AND gate 18 in conjunction with the presence of the first target mode signal at a second input of the AND gate 18. The simultaneous presence of both of the aforementioned signals at their respective inputs of the AND gate 18 generate an output signal that is applied to the maximum range flip-flop 16 via the OR gate 17, thereby causing the maximum range flip-flop 16 to change to its inhibited state. Summarizing, since both flip-flops must be enabled in order for the range gate 15 to pass any target return signals, only the first target return signal will pass through the range gate 15 when the system is in the first target return mode.

When the selective target ranging system 10 is in the last target mode, the operation of the range gate 15, the maximum range flip-flop 16 and the minimum range flip-flop 19 is basically identical to their operation during the first target mode except that the maximum range flip-flop 16 is not changed to its inhibited state upon the occurrence of the first target return signal that is processed by the system since the first target mode signal is no longer present at the second input of the AND gate 18. Thus, further target return signals may be processed by the system in the last target mode.

In the last target mode the maximum range flip-flop 16 will commence the inhibiting of the range gate 15 only when the "maximum range signal" from the control counter 13 is applied to the maximum range flip-flop 16 via the OR gate 17. The "maximum range signal" occurs at a time corresponding to the maximum intended range of the system. Summarizing, in the last target mode, the range gate 15 is capable of passing a plurality of target return signals between a minimum and maximum range.

The operation of the selective target ranging system 10 in both of the aforementioned modes may be better understood by referring to FIG. 2. At the time $t_0$, the reset signal ($a$) is utilized to reset the counters 13 and 14 to their zero count state as illustrated by the analog of the range as represented by the count registered by both counters during the first target mode ($h$) and the last target mode ($k$). At the time $t_1$, the synchronizing signal ($b$) sets the clock gate 11($c$) to the "on" condition. The clock gate 11($c$) remains in the "on" condition until the time $t_5$, at which time the "counter full signal" from the control counter 13 resets the clock gate 11($c$) to the "off" condition. During the time that the clock gate 11($c$) is in the "on" condition, the clock pulses ($d$) are applied to the counters 13 and 14 in order that both counters may register their respective counts. Furthermore, the synchronizing signal ($b$) is also utilized to inhibit the normally enabled minimum range flip-flop 19($e$), and the reset signal ($a$) is utilized to enable the normally inhibited maximum range flip-flop 16 when the system is in the first target mode ($f$) or in the last target mode ($i$), respectively.

When the selective target ranging system 10 is in the first target mode, the minimum range flip-flop 19($e$) will be inhibited from the time $t_1$ to the time $t_2$, when the minimum range is reached, and the maximum range flip-flop 16($f$) will be inhibited from the time $t_3$, when the first target return signal occurs, until it is enabled by the next reset signal ($a$) during the next cycle. Therefore, during the first target mode, the aforementioned flip-flops will be both enabled from the time $t_2$ until the time $t_3$, thus the range gate 15($g$) will be in the "on" condition from the time $t_2$ until the first target return signal is processed through the range gate at the time $t_3$. As stated earlier, both flip-flops will ben enabled during the period from the time $t_0$ until the time $t_1$. However, since the laser or radar transmitter pulse has not yet been fired during this period, no target return signals will be present at the input to the range gate 15 during this time. Thus only between the time $t_2$ and the time $t_3$ will the range gate 15 pass a target return signal.

The analog of the range as represented by the count registered by both counters in the first target mode ($h$) illustrates the count register in each counter relative to time. At the time $t_0$, as stated earlier, the reset signal ($a$) resets the count in both counters to their zero count state, and at the time $t_1$ the synchronizing signal ($b$) sets the clock gate 11($c$) to the "on" condition to allow the commencement of the counting sequence. The solid line and the dotted line represent the analog of the count in the control counter 13 and the range counter 14, respectively.

The range counter 14 will register a count from the time $t_1$, except for the inhibiting period at the commencement of the counting sequence, until the time $t_3$, when the first target return is detected, at which time the counter 14 will be reset to its zero count state. The range counter 14 will then commence counting again after the target return reset pulse is no longer applied to the range counter, and will register the count until the "counter full signal" places the clock gate 11 in the "off" condition; thereafter no additional clock pulses will be applied to the counter 14, thus the counting sequence will cease. Since the count registered in the range counter 14, at the time $t_5$, represents the count registered from the time of the lagging edge of the output pulse from the target return reset 20 until the time $t_5$, the digital output from the complement side of each binary counter element (not shown) in the range counter 14 would appear to represent the digital range time interval from the transmitter pulse to the lagging edge of the target return reset pulse. However, since the control counter 13 has been inhibited at the commencement of its count for a period equal to the normal reset pulse time of the target return reset 20, the digital output from the complement side of each binary in the range counter 14 represents the digital range time interval from the transmitter pulse to the leading edge of the first target return reset pulse, or in other words, the digital range from the transmitter to the first processed target. The aforementioned digital output may be applied to another system, such as a target avoidance system, not shown, or it may be applied to the digital range display 23 to display the range of the first target.

When the selective target ranging system 10 is in the last target mode, the minimum range flip-flop 19($e$) will be inhibited from the time $t_1$ to the time $t_2$, when the minimum range is reached, and the maximum range flip-flop 16($i$) will be inhibited from the time $t_4$, when the "maximum range signal" is applied to the maximum range flip-flop 16, until it is enabled by the next reset signal ($a$) during the next cycle. Therefore, during the last target mode, the aforementioned flip-flops will both be enabled from the time $t_2$ until the time $t_4$ thus the range gate 15($j$) will be in the "on" condition from the time $t_2$ until the time $t_4$, the time when the "maximum range signal" occurs. In the last target mode, as in the first target mode, both flip-flops will be enabled during the period from the time $t_0$ until the time $t_1$. However, since the laser or radar transmitter pulse has not yet been fired during this period, no target return signals will be present at the input to the range gate 15. Thus no target return signals will be processed by the selective target ranging system 10 during this time interval. Therefore, in the last target mode, the range gate 15 will only pass a target return signal during the period from the time $t_2$ to the time $t_4$. The analog of the range as represented by the count registered by both counters in the last target mode ($k$) illustrates the count registered in each counter relative to time. At the time $t_0$, as stated earlier, the reset signal ($a$) resets the count in both counters to their zero count state, and at the time $t_1$ the synchronizing signal ($b$) sets the clock gate 11($c$) to the "on" condition to allow the commencement of the counting sequence. The solid line and the dotted line represent the analog of the count in the control counter 13 and the range counter 14, respectively.

The range counter 14 will register the count from the time $t_1$, except for the inhibiting period at the commencement of the counting sequence, until any target return signal is detected, at which time the counter will be reset to its zero count state. As illustrated by the analog of the count of both counters ($k$), several target return signals have been processed by the selective target ranging system 10 at the times $k_1$, $k_2$, and $k_3$, respectively. Each time a target return signal has been processed the range counter 14 has been reset to its zero count state. In every case the range counter 14 commences counting again after the target return reset pulse is no longer applied to the range counter, and the range counter will register the count until the "counter full signal" from the control counter 13 places the clock gate 11 in the "off" condition. After the clock gate 11 is gated off, no additional clock pulses will be applied to the range counter 14, and thus the counting sequence will cease. Since the count registered in the range counter 14, at the time $t_5$, represents the count from the time of a lagging edge of the last target return reset pulse until the time $t_5$, the digital output from the complement side of each binary counter element in the range counter 14 would appear to represent the digital range time interval from the transmitter pulse to the lagging edge of the last target return reset pulse. However, since the control counter 13 has been inhibited at the commencement of its count for a period equal to the normal reset pulse time of the target return reset 20, the digital output from the complement side of each binary in the range counter 14 represents the digital range time interval from the transmitter pulse to the leading edge of the last target return reset pulse, or in other words, the digital range from the transmitter to the last processed target. The aforementioned digital output may be applied to another system, such as a terrain avoidance system, not shown, or it may be applied to the digital range display 23 to display the range of the last target.

It is further noted, that since there is no cumulative effect of the target return reset pulse; therefore, it is only necessary to inhibit the control counter 13 at the commencement of the counting sequence for one normal reset pulse time of the target return reset 20.

Thus, although the present invention has been shown and described with reference to particular embodiments, nevertheless, various changes and modifications obvious to a person skilled in the art to which the invention pertains are deemed to lie within the spirit, scope, and contemplation of the invention as set forth in the appended claims.

What is claimed is:

1. A selective target ranging system having a first target mode of operation for determining the range of the first target within predetermined minimum and maximum range limits and having a second target mode of operation for determining the range of the last target within the predetermined minimum and maximum range limits comprising:

transmitter means for periodically transmitting directional energy to remote targets;

reception means for receiving portions of the directional energy reflected by the remote targets;

counter means for producing first and second signals which respectively determine the minimum and maximum range limits of the system, a third signal which determines the maximum counting period of said counter means, and output information on the range of the target selected as a function of the selected mode of operation;

electric pulse circuit means coupled to said transmitter means and to said counter means for producing clock pulses for causing said counting means to count, said electric pulse circuit means being responsive to the third signal for preventing the application of clock pulses to said counter means until the next periodic transmission of energy by said transmitter means;

target range circuit means coupled to said reception means for receiving target return signals indicative of the range of the remote targets and having an output coupled to said counter means for controlling the counting of said counter means, said target range circuit means being responsive to the first signal for allowing target return signals of remote targets beyond the minimum range limit to pass therethrough and being responsive to the second signal for prohibiting target return signals of remote targets beyond the maximum range limit from passing therethrough; and logic circuit means coupled to said counter means and to said target range circuit means for controlling said target range circuit means as a function of the selected mode of operation.

2. A selective target ranging system having a first target mode of operation for determining the range of the first target within predetermined minimum and maximum range limits and having a second target mode of operation for determining the range of the last target within the predetermined minimum and maximum range limits comprising:

transmitting means for periodically transmitting directional electro-magnetic radiation to remote targets;

receiving means for receiving the radiation reflected by the remote targets;

a range counter for providing output information on the range of the target selected as a function of the selected mode of operation;

a control counter for producing first and second signals which respectively determine the minimum and maximum range limits of the system and a third signal which determines the maximum counting period of both of said range and control counters;

electric pulse circuit means coupled to said transmitting means and to both of said counters for producing clock pulses for causing said counters to count, said electric pulse circuit means being responsive to the third signal for preventing the application of clock pulses to both of said range and control counters until the next periodic transmission of energy by said transmitting means;

target range circuit means coupled to said receiving means for receiving target return signals indicative of the range of remote targets and having an output coupled to said range counter for controlling the counting of said range counter, said target range circuit means being responsive to the first signal for allowing target return signals of remote targets beyond the minimum range limit to pass therethrough and being responsive to the second signal for prohibiting target return signals of remote targets beyond the maximum range from passing therethrough; and logic circuit means coupled to said control counter and to said target range circuit means for controlling said target range circuit means as a function of the selected mode of operation.

3. The system as set forth in claim 2 wherein said electric pulse circuit means includes an oscillator for developing the clock pulses, and gating circuitry coupled to said oscillator for allowing said counters to count the clock pulses in the absence of the application of the third signal thereto and for inhibiting the application of the clock pulse to said counters in response to the application of the third signal thereto.

4. The system as set forth in claim 2 wherein said logic circuit means includes selection means for selecting one of the modes of operation.

5. The system as set forth in claim 2 further including display means coupled to said range counter to provide a range display of a selected remote target within the predetermined minimum and maximum range limits.

6. The system as set forth in claim 2 wherein said transmitting means is coupled to said control counter, range counter, electric pulse circuit means and logic circuit means, respectively, for producing early and late timing pulses to respectively reset said counters and synchronize the system operation in conjunction with each periodic transmission of directional energy from said transmitting means.

7. A system for selectively displaying the range of predetermined remote targets in space comprising:
transmitting means, including a laser, for producing directional energy;
reception means for receiving portions of said directional energy reflected by said remote targets;
a control counter for producing output signals which determine the minimum and maximum range limits of the system;
a range counter for providing remote target range information;
electric pulse circuit means coupled to both of said counters for providing clock pulses to cause said counters to count;
target range circuit means coupled to said reception means for receiving signals indicative of the range of said remote targets and having an output coupled to said range counter for controlling said range counter;
logic circuit means coupled to said control counter and to said target range circuit means and being responsive to the output signals from said control counter for controlling the duration of time that said target range circuit means may process the signals indicative of the range of the remote targets; and
display means coupled to said range counter for displaying the range of the last remote target processed by said target range circuit means, said transmitting means being coupled to said control counter, range counter, electric pulse circuit means and logic circuit means, respectively, for producing early and late timing pulses to respectively reset said counters and synchronize the system operation in conjunction with each periodic transmission of directional energy from said transmitting means.

8. The system of claim 7 wherein said logic circuit means includes selection means for controlling whether the range of the first target or the range of the last target occurring within said duration of time within which said target range circuit means may process said signals indicative of the range of said remote targets will be computed by said range counter and be displayed by said display means.

9. The system as set forth in claim 8 including control means coupled to said control counter and said range counter for inhibiting and resetting the count of said control counter and said range counter, respectively.

10. The system of claim 8 wherein said selection means includes:
mode control means for receiving a first target mode signal when the range of the first target occurring within said duration of time is selected to be computed by said range counter; and
gating means coupled to said target range circuit means and to said mode control means and being responsive to the presence of the first target mode signal for allowing said target range circuit means to process only the first target occurring within said duration of time and being responsive to the absence of the first target mode signal for allowing said target range circuit means to process the last target occurring within said duration of time.

References Cited
UNITED STATES PATENTS

| | | | |
|---|---|---|---|
| 2,421,018 | 5/1947 | De Rosa | 343—7(RS)UX |
| 3,142,058 | 7/1964 | Rhodes | 343—13 |
| 3,222,671 | 12/1965 | Di Matteo | 343—7X |
| 3,409,368 | 11/1968 | Fernandez | 356—5 |

RONALD L. WIBERT, Primary Examiner

F. L. EVANS, Assistant Examiner

U.S. Cl. X.R.

343—7, 13